Jan. 13, 1959  S. SCHWARTZ  2,867,927
PROTECTIVE COVERS FOR PHOTOGRAPHIC TRANSPARENCIES
Filed June 7, 1954
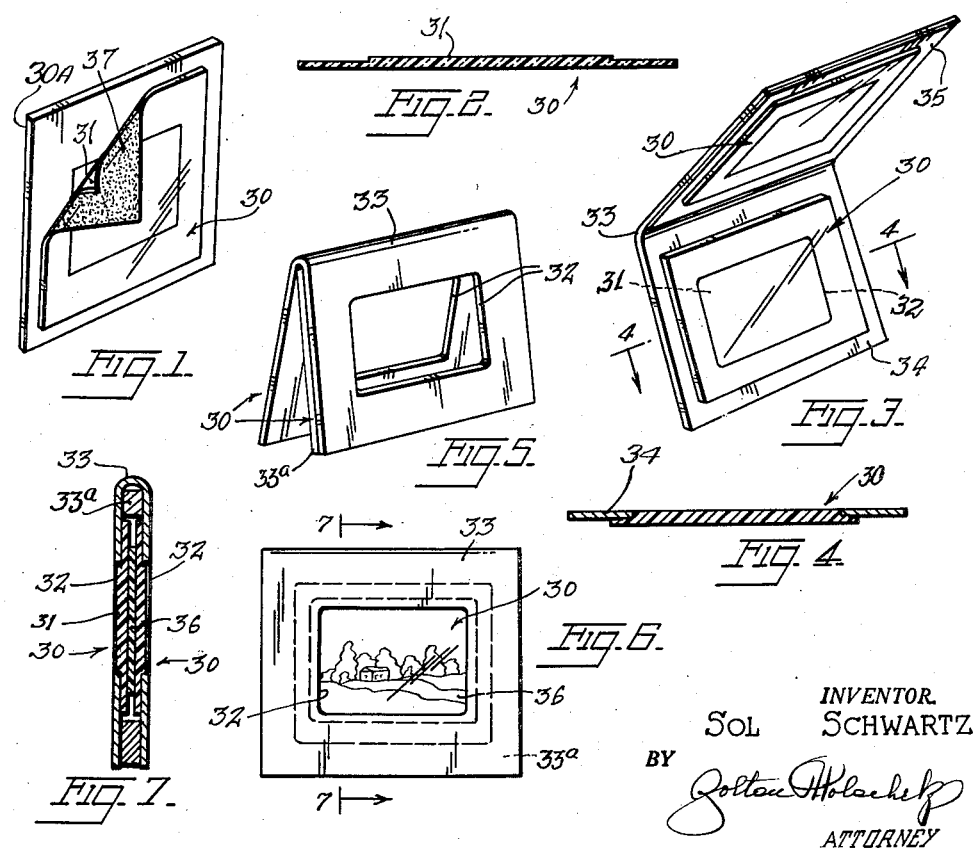
INVENTOR.
SOL SCHWARTZ
BY
ATTORNEY

2,867,927

PROTECTIVE COVERS FOR PHOTOGRAPHIC TRANSPARENCIES

Sol Schwartz, Flushing, N. Y.

Application June 7, 1954, Serial No. 434,968

1 Claim. (Cl. 40—158)

This invention relates to new and useful improvements in protective covers for photographic transparencies or slides and to methods of mounting film for such.

More particularly, the present invention proposes the construction of an improved method of mounting and an improved protective device for photographic transparencies which will permit these transparencies to be handled without damage to the film.

As a further object, the present invention proposes constructing a protective device in the form of a thin sheet of transparent optic material of the same area as a transparency frame and having a peripheral adhesive coating on one side as a border for securing to a transparency frame, the transparent optic sheet being removably secured to a backing sheet by such peripheral adhesive border.

Another object of the present invention proposes constructing the transparent optic sheet so that it will cover substantially only the window of a transparency frame on the inside of the frame to protect film therein from finger prints, scratches, dirt, and from color fading where the film is color film as is most commonly the case with transparencies.

It is another object of the present invention to form the transparent optic sheet with means quickly and easily to align it on a transparency frame so that the frame can be used in projectors and slide devices without sticking or jamming.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a perspective view of a transparent optic sheet removably mounted on a backing sheet in accordance with the present invention.

Fig. 2 is a longitudinal section of the transparent optic sheet shown in Fig. 1.

Fig. 3 is a perspective view of a transparency frame with the two halves of the frame open and with transparent optic sheets such as the one shown in Figs. 1 and 2 covering the window openings of the frame inside the frame.

Fig. 4 is a sectional view taken on line 4—4 of Fig. 3.

Fig. 5 is a view similar to Fig. 3 but showing the frame in a more folded condition.

Fig. 6 is a front view of the frame shown in Figs. 3, 4 and 5 but with a film secured therein.

Fig. 7 is a sectional view taken on line 7—7 of Fig. 6.

The protective device for photographic transparencies made in accordance with the present invention consists of a transparent optic sheet 30 having a raised portion 31, adapted to fit into the window opening 32 of a photographic transparency frame 33 to align and hold the sheet 30 to the transparency frame 33. Sheet 30 is of an area greater than the window opening 32 but less than the transparency frame 33. Two sheets 30 are used with one frame 33, one sheet being secured to one half 34 of the frame 33 and the other to frame half 35. The sheets 30 are mounted over the window openings 32 inside the frame before the two frame halves are secured together. A film 36 is disposed between the sheets 30 before the frame halves are secured together.

A suitable intermediate rectangular spacer frame 33a is also provided between the sheets 34 and 35 of the frame 33.

The method of mounting photographic transparencies in accordance with the present invention consists in the first step of securing in a transparency frame the film to be mounted. This step can be done in the regular manner now employed using a folding cardboard transparency frame. The frame is then covered either completely on its front and back faces or the window openings of the frame alone are covered with transparent sheets of transparent optic material which are secured in place to the frame and do not extend beyond the periphery of the frame. The transparent optic material may be secured either on the outside of the frame or inside the frame between the folding frame halves. In the latter event, the film to be mounted is disposed directly between the transparent optic material.

It is to be understood that the various materials may be of any desired thickness, strength or hardness and may be made of any suitable material.

While I have illustrated and described the preferred embodiment of my invention, it is to be understood that I do not limit myself to the precise constructions herein disclosed and the right is reserved to all changes and modifications coming within the scope of the invention as defined in the appended claim.

Having thus described my invention, what I claim as new and desire to secure by United States Letters Patent is:

A protective device for photographic transparencies in combination with a frame, comprising a transparency retaining frame folded over providing frame sections with aligned windows, transparent optic sheets of a size smaller than the frame sections and larger than the windows, said sheets including central raised portions equal in size to the windows and retained therein, and an intermediate rectangular spacer frame separate from the retaining frame mounted between said frame sections adjacent the folded over edge.

References Cited in the file of this patent

UNITED STATES PATENTS

| | | |
|---|---|---|
| 1,464,447 | Shachka | Aug. 7, 1923 |
| 2,268,529 | Stiles | Dec. 30, 1941 |
| 2,271,946 | Miller | Feb. 3, 1942 |
| 2,291,173 | Simpson | July 28, 1942 |
| 2,432,515 | De Sherbinin | Dec. 16, 1947 |
| 2,490,058 | Jablon | Dec. 6, 1949 |
| 2,496,008 | Jablon | Jan. 31, 1950 |
| 2,587,434 | Boaden | Feb. 26, 1952 |
| 2,598,755 | Birch | June 3, 1952 |

FOREIGN PATENTS

| | | |
|---|---|---|
| 677,494 | Germany | June 27, 1939 |